United States Patent
Johnston

(10) Patent No.: US 10,955,638 B2
(45) Date of Patent: Mar. 23, 2021

(54) DEPLOYING OPTICAL FIBER ON A ROAD SURFACE

(71) Applicant: Charter Communications Operating, LLC, St. Louis, MO (US)

(72) Inventor: Chad D. Johnston, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/383,472

(22) Filed: Apr. 12, 2019

(65) Prior Publication Data
US 2020/0132958 A1 Apr. 30, 2020

Related U.S. Application Data

(60) Provisional application No. 62/750,229, filed on Oct. 24, 2018.

(51) Int. Cl.
| E01C 23/00 | (2006.01) |
| G02B 6/50 | (2006.01) |
| E01C 23/09 | (2006.01) |
| E01C 11/00 | (2006.01) |
| G02B 6/44 | (2006.01) |

(52) U.S. Cl.
CPC .............. *G02B 6/504* (2013.01); *E01C 11/00* (2013.01); *E01C 23/0926* (2013.01); *G02B 6/4451* (2013.01)

(58) Field of Classification Search
CPC ....... G02B 6/4451; G02B 6/504; E01C 11/00; E01C 23/0926
USPC .................................. 404/17, 71, 72, 75, 78
See application file for complete search history.

(56) References Cited

U.S. PATENT DOCUMENTS

| 4,028,081 A | * | 6/1977 | Marcatili | .............. | C03B 37/022 65/392 |
| 6,877,930 B2 | * | 4/2005 | Stromdahl | ............ | E01C 23/128 299/17 |
| 7,095,930 B2 | * | 8/2006 | Storaasli | ................ | G02B 6/504 385/100 |
| 8,033,641 B2 | * | 10/2011 | Hilmersson | .............. | B28D 1/00 347/37 |
| 9,062,423 B2 | * | 6/2015 | Allouche | ................. | H02G 9/00 |
| 9,531,174 B2 | * | 12/2016 | Elford | .................... | E01C 23/025 |
| 9,534,351 B2 | * | 1/2017 | Paulos | .................... | E01F 9/571 |

(Continued)

OTHER PUBLICATIONS

Ivancic, A sticky solution to building broadband infrastructure, Apr. 12, 2017, downloaded Aug. 7, 2018, 5 pages https://www.fauquier.com/news/a-sticky-solution-to-building-broadband-infrastructure/article_d1422ffe-1fab-11e7-bba1-6b27d76d0e52.html.

(Continued)

*Primary Examiner* — Raymond W Addie
(74) *Attorney, Agent, or Firm* — Otterstedt, Wallace & Kammer, LLP

(57) ABSTRACT

An optical fiber tape includes a matrix and at least one optical fiber connected to the matrix in an undulating manner. The undulations of the optical fiber are generally sinusoidal, semicircular, or elliptic, and are of amplitude and wavelength such that the minimum bend radius of each undulation is not less than a minimum bend radius specified by a manufacturer of the optical fiber. A road having an upper surface has a pathway indented into the upper surface to less than full depth of the road and has the optical fiber tape laid in the pathway so that the optical fiber tape does not protrude above the upper surface of the road.

11 Claims, 4 Drawing Sheets

(56) References Cited

U.S. PATENT DOCUMENTS

Figure 1:
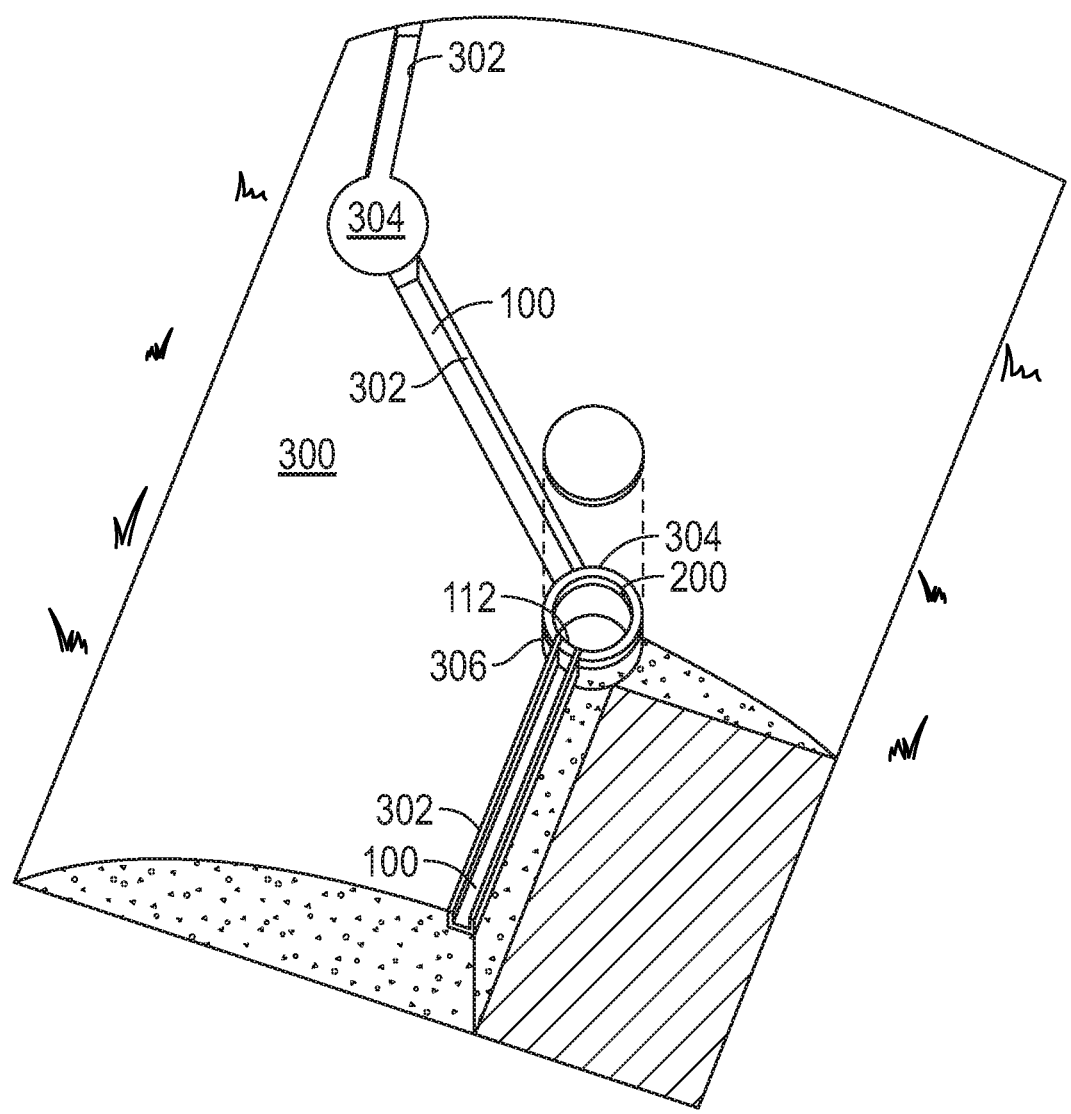

| | | | |
|---|---|---|---|
| 10,209,476 B2 | 2/2019 | Johnston et al. | |
| 2002/0146213 A1* | 10/2002 | Shigenaga | G02B 6/3839 |
| | | | 385/78 |
| 2003/0123935 A1* | 7/2003 | Dofher | G02B 6/4451 |
| | | | 405/183.5 |
| 2012/0195694 A1* | 8/2012 | Konczak | C04B 28/021 |
| | | | 405/267 |
| 2013/0223807 A1* | 8/2013 | Elford | G02B 6/504 |
| | | | 385/134 |
| 2015/0037096 A1* | 2/2015 | Levendos | H02G 9/02 |
| | | | 404/71 |
| 2016/0109036 A1* | 4/2016 | Elford | H04Q 11/0067 |
| | | | 405/184.1 |
| 2016/0356975 A1* | 12/2016 | Lish | G02B 6/4495 |
| 2018/0017750 A1* | 1/2018 | Clatanoff | C09J 7/38 |
| 2018/0231733 A1 | 8/2018 | Johnston et al. | |
| 2019/0226603 A1* | 7/2019 | Pino, Jr. | E02F 5/10 |

OTHER PUBLICATIONS

Engebretson, Gluing Fiber to the Road: FiberTRAX Aims to Reduce Fiber Costs, Deployment Times, Jul. 9, 2018, downloaded Aug. 7, 2018, 3 pages https://www.telecompetitor.com/gluingfiber-to-the-road-fibertrax-aims-to-reducefiber-costs-deployment-times/.

AFL webpage—SpiderWeb Ribbon (SWR®) for highly efficient ribbonizing applications or for individual fiber breakouts, downloaded May 30, 2018, 3 pages https://www.aflglobal.com/Products/Fiber-Optic-Cable/SpiderWeb-Ribbon-(SWR-).aspx.

Digital Metrology—Tip Radius Selection for Roundness web page, downloaded Aug. 7, 2018, 5 pages http://digitalmetrology.com/tip-radius-for-roundness/.

Waterblasting Technologies, "Advantages of the Hog Rider—HT 2500", http://www.waterblastingtechnologies.com/products/hogtools-ht2500/, Wayback Machine, Apr. 2, 2019. Downloaded Feb. 17, 2020. pp. 1-4.

\* cited by examiner

DEPLOYING OPTICAL FIBER ON A ROAD SURFACE

CROSS REFERENCE TO RELATED APPLICATIONS

This application claims the benefit of U.S. Provisional Application Ser. No. 62/750,229, "Deploying Optical Fiber on a Road Surface," filed on 24 Oct. 2018, the complete disclosure of which is expressly incorporated herein by reference in its entirety for all purposes.

FIELD OF THE INVENTION

The present invention relates generally to the optical and mechanical arts, and more particularly relates to deployment of optical fiber.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Certain challenges arise in deploying optical fiber to provide a cable network or other IP network. These challenges include cost, time to install, disruption to municipal infrastructure, negotiation of leases for existing poles, permits for digging pathways, etc.

SUMMARY OF THE INVENTION

Techniques are provided for deploying optical fiber on a road surface.

In one aspect, an optical fiber tape includes a matrix and at least one optical fiber connected to the matrix in an undulating manner. The undulations of the optical fiber are, for example, generally sinusoidal, semicircular, or elliptic, and are of amplitude and wavelength such that the minimum bend radius of each undulation is not less than a minimum bend radius specified by a manufacturer of the optical fiber.

In another aspect, a road having an upper surface has a pathway indented into the upper surface to less than full depth of the road and has the optical fiber tape laid in the pathway so that the optical fiber tape does not protrude above the upper surface of the road.

In still another aspect, a method for deploying the optical fiber tape on a road includes preparing an upper surface of the road by indenting into the upper surface a pathway and laying the optical fiber tape into the pathway so that the optical fiber tape does not protrude above the upper surface of the road, and is laid into the pathway with the undulations of the optical fiber in a plane parallel to the upper surface of the road.

Techniques of the present invention can provide substantial beneficial technical effects. For example, one or more embodiments enhance the durability of optical fiber that is deployed on a road surface subject to environmental variations and traffic loads. Additionally, one or more embodiments enable building a larger optical fiber network at the same cost as a smaller conventional network. Furthermore, one or more embodiments enable installation of a fiber network in less time and with less disruption to municipal infrastructure than conventional methods.

These and other features and advantages of the present invention will become apparent from the following detailed description of illustrative embodiments thereof, which is to be read in connection with the accompanying drawings.

BRIEF DESCRIPTION OF THE DRAWINGS

FIG. 1 depicts, in a perspective view, an optical fiber tape that is embedded into a road surface, according to an exemplary embodiment;

FIG. 2 depicts, in an exploded view, details of the optical fiber tape of FIG. 1, according to an exemplary embodiment;

FIG. 3 depicts, in an end view, details of the optical fiber tape of FIG. 2;

FIG. 4A depicts, in a side schematic view, proportions of an optical fiber and a sinusoidal undulation of the optical fiber within the optical fiber tape of FIGS. 1-3;

FIG. 4B depicts, in a side schematic view, proportions of an optical fiber and a semicircular undulation of the optical fiber within the optical fiber tape of FIGS. 1-3;

FIG. 5 depicts, in an exploded view, details of an optical fiber tape that includes multiple ribbons of optical fibers;

FIGS. 6A, 6B, 6C, and 6D (collectively, FIG. 6) depict, in an end view, details of the optical fiber tape of FIG. 5; and FIG. 7 depicts, in a flowchart, a method for deploying the optical fiber tape and the fiber junction box into the road surface, according to an exemplary embodiment.

DETAILED DESCRIPTION OF PREFERRED EMBODIMENTS

In one or more embodiments, deployment of optical fiber tape is made more cost effective by laying the tape directly onto the road surface rather than into a pathway under the road or onto elevated poles alongside the road. Trenching requires expensive equipment and time-consuming road repair, while space on elevated poles must be leased from the owners of the poles and/or has its own associated maintenance and deployment costs. However, there are certain difficulties in maintaining unprotected fiber on a road surface.

One particular difficulty is a problem with thermal expansion and contraction of pavement compared to that of bare optical fiber. The pavement has a relatively high coefficient of thermal expansion (CTE), and changes shape in all directions with changing environmental temperature, whereas bare fiber has a relatively low CTE and essentially only changes its length. For example, asphalt's CTE ranges from $2.046\times10^{-5}$ through $6.321\times10^{-5}$/° C. ($1.137\times10^{-5}$ through $3.512\times10^{-5}$/° F.) while typical values for concrete range from $7\times10^{-6}$ to $14\times10^{-6}$ per ° C. By contrast, the CTE of typical optical fiber has been measured to be about $0.5 \times 10^{-6}$ per °C. Thus, bare fiber does not compensate for temperature-induced flexure of the road surface and becomes prone to fatigue cracking that ends the useful life of the tape.

Accordingly, an aspect of the invention is the use of an undulating fiber profile to alleviate fatigue stress cracking. Although the intrinsic CTE of the optical fiber material does not itself change, the overall undulating fiber structure gives slack for the fiber to stretch and contract to match the thermal deformation of the pavement without breakage of the fiber. Such an undulating fiber profile can be defined and supported by attaching the optical fiber to a matrix material, which cushions the fiber against impact loading and permits the fiber to flex under longitudinal or lateral loading due to CTE mismatch. The optical fiber can be attached to a surface of the matrix material, or alternatively, the optical fiber can be embedded into the matrix material. Suitable matrices include, e.g., perforated vinyl screen, perforated foam sill plate, aramid, cotton, polyester, polyethylene terephthalate, polystyrene, polypropylene, polyethylene, polyurethane, Sorbothane material (brand of synthetic viscoelastic urethane polymer used as a shock absorber and vibration damper, available from Sorbothane, Inc., Kent, Ohio, USA), wool, wood wool, liquid crystal polymer, epoxy, and the like. In one or more embodiments, the undulations provide slack for thermal expansion/contraction in both planar directions.

Another difficulty to be considered regarding direct deployment of optical fiber onto a road surface is the repeated loading from vehicle traffic along the road or scraping action from snow plows or the like. The tape laid on the road surface presents a small bump that not only is subject to (compressive) impact when vehicles cross over it, but also is subject to cyclic lateral (tensile) force when vehicles travel along it or when snow plows clear the road. Thus, although it might be expected that optical fiber could withstand the impact forces for a reasonable length of time, the cyclic lateral forces can present more of a problem for durability. Snow plows and street cleaners present special problems in this regard.

Accordingly, an aspect of the invention is the consideration that mechanical durability of an optical fiber on a road surface can be enhanced by embedding the fiber into the upper surface of the road, e.g., in a less-than-full-depth pathway (i.e. pathway sized to accommodate the fiber but not to the full depth of the road surfacing material). Such a pathway can be efficiently prepared by scoring the upper surface of the road using, e.g., water jet technology or abrasive wheel grinding for a controllable partial depth cut. The optical fiber tape can then be embedded into the partial depth pathway to provide a flat or flush profile of the tape on top of the road, that is, with an upper surface of the tape not protruding above the upper surface of the road.

Another consideration in deployment of optical fiber onto a road surface is how and where to splice the fiber lengths. Splice junctions require a volume of protected space that is not easily provided by simple trenching.

Accordingly, an aspect of the invention is the provision of a fiber junction box embedded into the upper surface of the road. Such a box provides an internal cavity where fiber lengths can be spliced under protection from mechanical loads, and which facilitates access to the fibers.

In view of the foregoing, FIG. 1 depicts an optical fiber tape 100 and a fiber junction box 200 that are embedded into a road surface 300 (box 200 can have, for example, a detachable lid or top, not separately numbered). The optical fiber tape 100 is embedded into a pathway 302, which in certain embodiments has a generally rectilinear profile. The fiber junction box 200 is embedded into a hole 304, which in certain embodiments is generally cylindrical with the box 200 also being generally cylindrical. The pathway 302 connects to the hole 304 along the road surface 300; an end of the pathway is depicted at 306. Note that the hole 304 and the fiber junction box 200 are optional additions to a simpler embodiment of the invention, by which the optical fiber tape 100 is deployed into the pathway 302 without requiring a fiber junction box 200 or a hole 304. Element 112, the end of the optical fiber tape, is discussed below.

Figure 2:
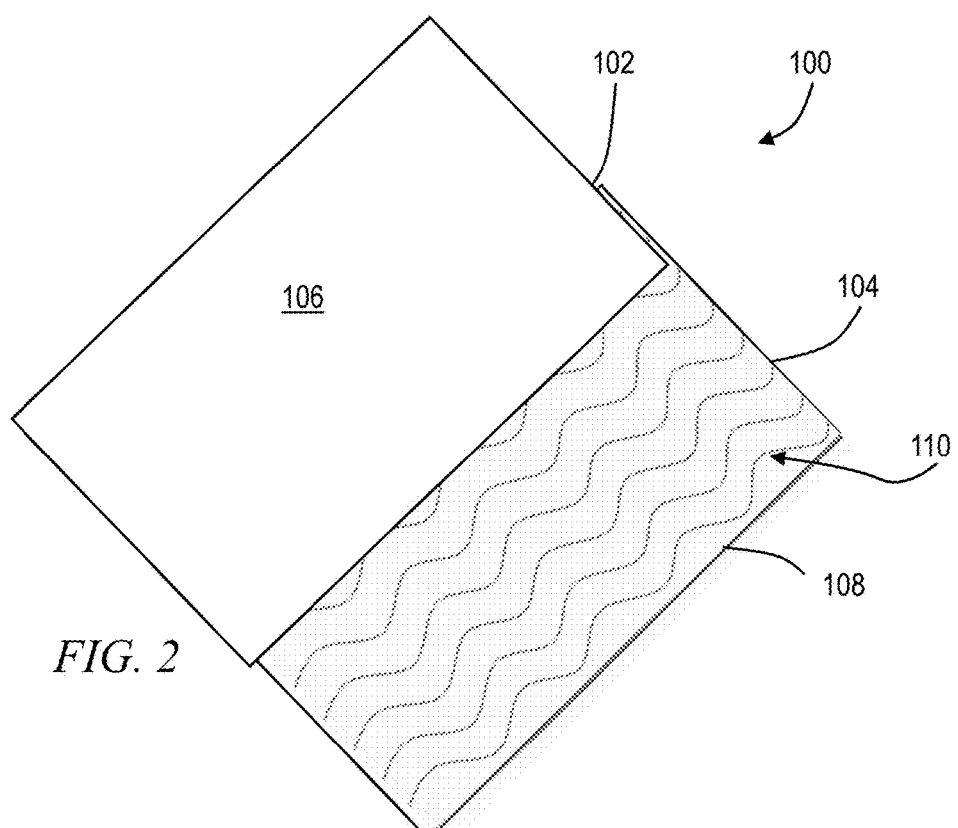
Figure 3:
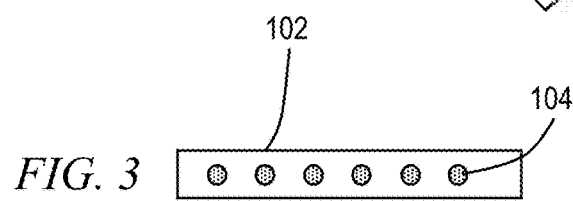
Figure 4A:
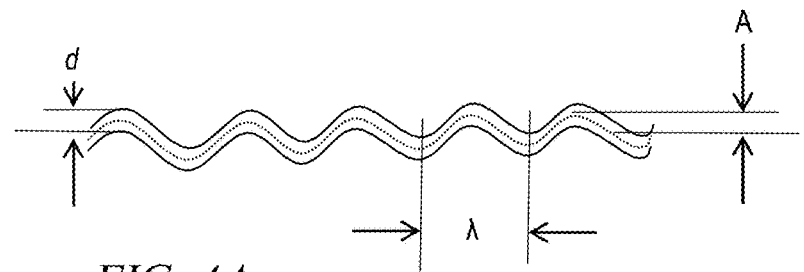
Figure 4B:
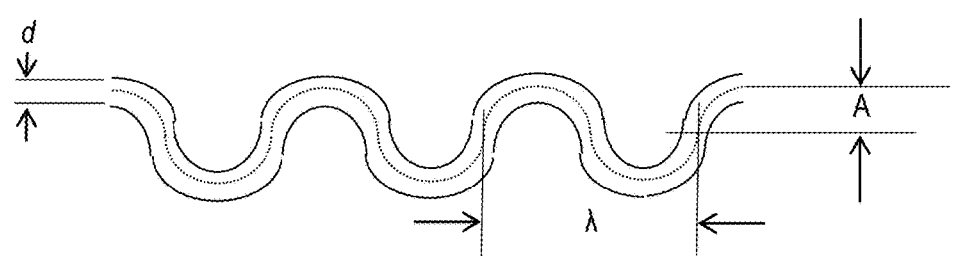
Figure 5:
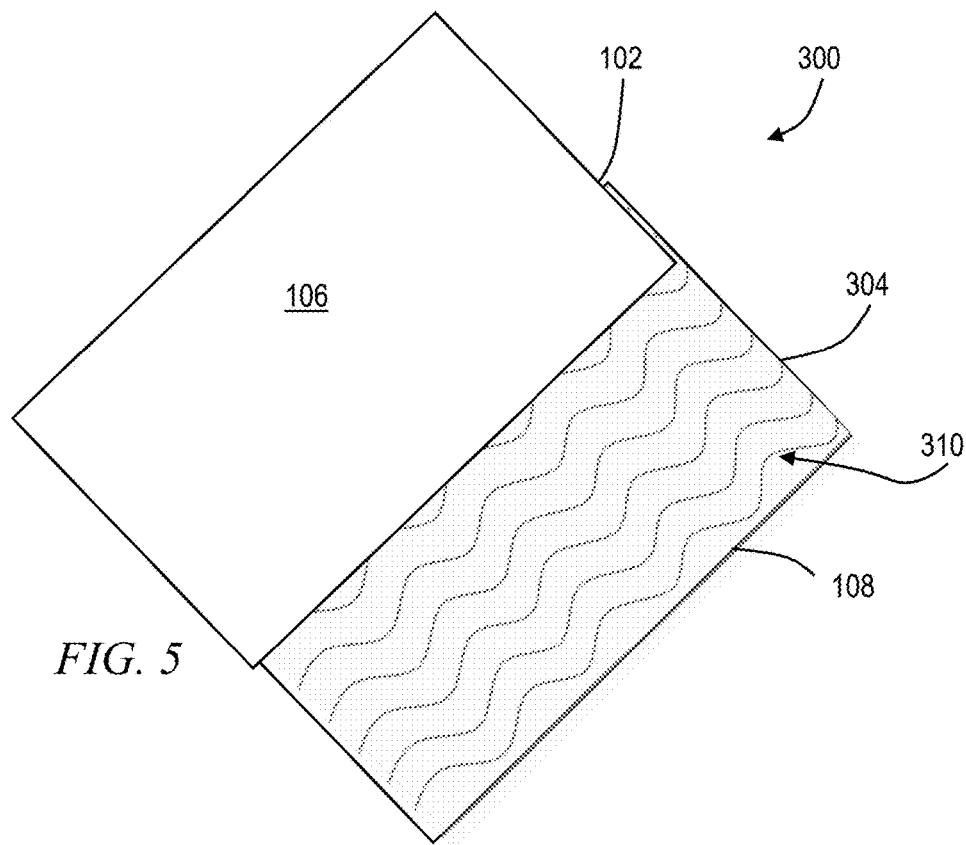

FIGS. 2 and 3 depict details of the optical fiber tape 100, which includes a matrix 102 in which one or more optical fibers 104 are embedded. In one or more embodiments, each of the optical fiber(s) 104 is captured between upper and lower portions 106, 108 of the matrix 102. Each optical fiber 104 has a fiber diameter d and defines undulations 110 of wavelength $\lambda$ and amplitude A. In one or more embodiments the undulations 110 are generally sinusoidal, as shown schematically in FIG. 4A. In one or more embodiments the undulations 110 are semicircular, as shown schematically in FIG. 4B, or are elliptic. In one or more embodiments, the undulations 110 are configured to adapt expansion and contraction of the fiber tape 100 to match thermal expansion and contraction of pavement into which the fiber tape is installed. In various embodiments, the undulations conform to bend radius guidance provided by the optical fiber's manufacturer. Bend radius guidance also can be generated by a skilled worker using finite element analysis software (e.g., ANSYS® software) to assess the stress imposed on a fiber by expansion or contraction for a range of bend radii, based on thermal and structural boundary conditions and types of materials used. ANSYS is a registered trademark of ANSYS INC., Canonsburg, Pa., USA. Generally, the bend radius R of a sine wave is obtained by $R=\lambda^2/(4\pi^2 A)$, where $\lambda$=wavelength of the sine wave, A=amplitude of the sine wave. For example, for a fiber diameter d of 0.005 inches (125 micron), the undulations 110 have a wavelength of between one and two inches and an amplitude of between 0.005 and 0.100 inches. Thus, the wavelength and amplitude are selected such that the undulations 110 do not have a bend radius R that is less than a minimum bend radius specified by the manufacturer or determined as acceptable from finite element analysis or other structural analysis. Further, the amplitude of each undulation 110 does not exceed the width of the tape 100. Thus, in one or more embodiments the lower bound of amplitude of each undulation is at least one fiber diameter with no upper limit other than width of the tape; in other embodiments, the lower bound of amplitude of each undulation is at least two times the fiber diameter, in other embodiments, at least five times the fiber diameter, in other embodiments at least ten times the fiber diameter, in other embodiments at least twenty times the fiber diameter. In one or more embodiments, the upper bound of amplitude of each undulation is no more than 100 times the fiber diameter; in other embodiments, no more than fifty times the fiber diameter, in other embodiments no more than twenty times the fiber diameter, in other embodiments no more than ten times the fiber diameter.

In one or more embodiments, the undulations put the fiber in a gentle bending stress mode due to thermal stress, as opposed to a cycle of tension/compression with possible buckling/cracking.

Generally, the undulations 110 of adjacent fibers 104 are separated by at least one fiber diameter, in one or more embodiments at least five fiber diameters, in certain embodiments at least ten fiber diameters, in other embodiments the undulations 110 are spaced apart by at least the amplitude of the undulations so that adjacent fibers are not nested. In one non-limiting embodiment, a fiber diameter is about 125 microns. In many embodiments the adjacent fibers may be nested with each other. In one or more embodiments, adjacent undulations may be aligned peak-to-peak (as seen in FIG. 2) so that the fibers 104 approach and recede from each other along the length of the tape 100.

Generally, the undulations 110 are in a plane parallel to the largest surface of the matrix 102. When the optical fiber tape 100 is installed into the road surface 300, the undulations 110 are laid parallel to the upper surface of the road; i.e., the fiber(s) undulate(s) in a plane that is parallel to the top surface of the road.

Figure 6A:
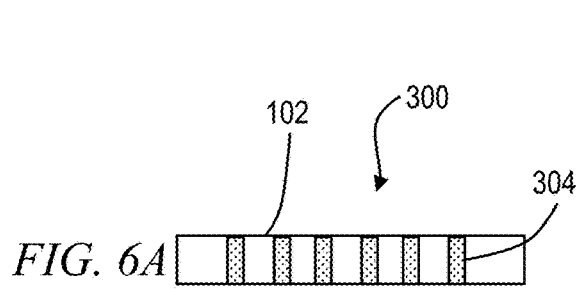
Figure 6B:
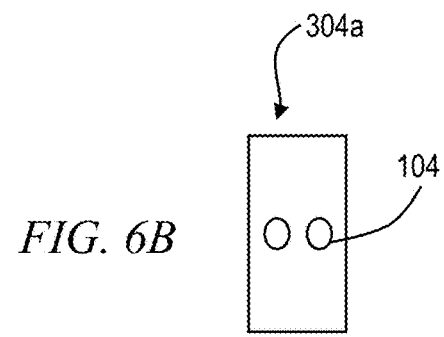
Figure 6C:
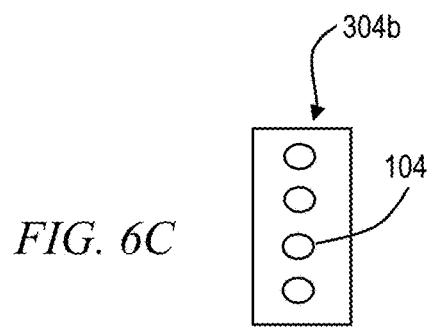
Figure 6D:
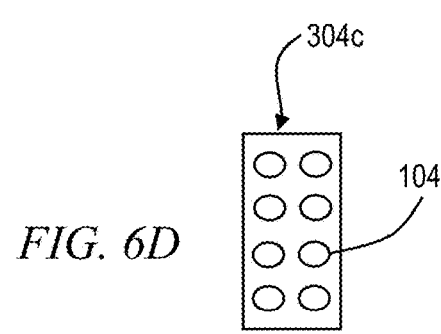

In one or more embodiments, as shown in FIGS. 5 and 6A-6D, an optical fiber tape 300 may include a plurality of optical fiber ribbons 304 that are laid side by side into a lower portion 108 of a matrix 102 and covered with an upper portion 106 (which may be omitted in some embodiments, in which the ribbons simply are embedded into a monolithic matrix). The ribbons 304 bend to form undulations 310 across a plane perpendicular to their broadest surfaces and parallel to a broadest surface of the optical fiber tape 300. Maximum and minimum wavelengths, amplitudes, and spacings of the undulations 310 are similar to those of the undulations 110 discussed with reference to FIGS. 2 and 3. The ribbons 304 may include optical fibers 104 in any arrangement, e.g., stacked against each other across the width of the ribbon and/or stacked against each other across the thickness of the ribbon. FIG. 6A shows a cross-sectional view of the optical fiber tape 300 including the optical fiber ribbons 304. FIG. 6B is a detail showing a "horizontal" arrangement of optical fibers 104 that are stacked together across the width of a ribbon 304a. FIG. 6C is a detail showing a "vertical" arrangement of optical fibers 104 that are stacked vertically within ribbon 304b. FIG. 6D is a detail showing a "grid" arrangement of optical fibers that are stacked together across the width and the thickness of a ribbon 304c.

In one or more embodiments, the optical fiber tape 100 or 300 may be rolled onto a spool. In one or more embodiments, the fibers are spaced sufficiently within the tape to facilitate splicing. In some cases, single fiber embodiments can undulate more than a ribbon with multiple fibers. In one or more embodiments, adjacent ribbons may be placed no closer than one half the width or thickness of each ribbon.

Figure 7:
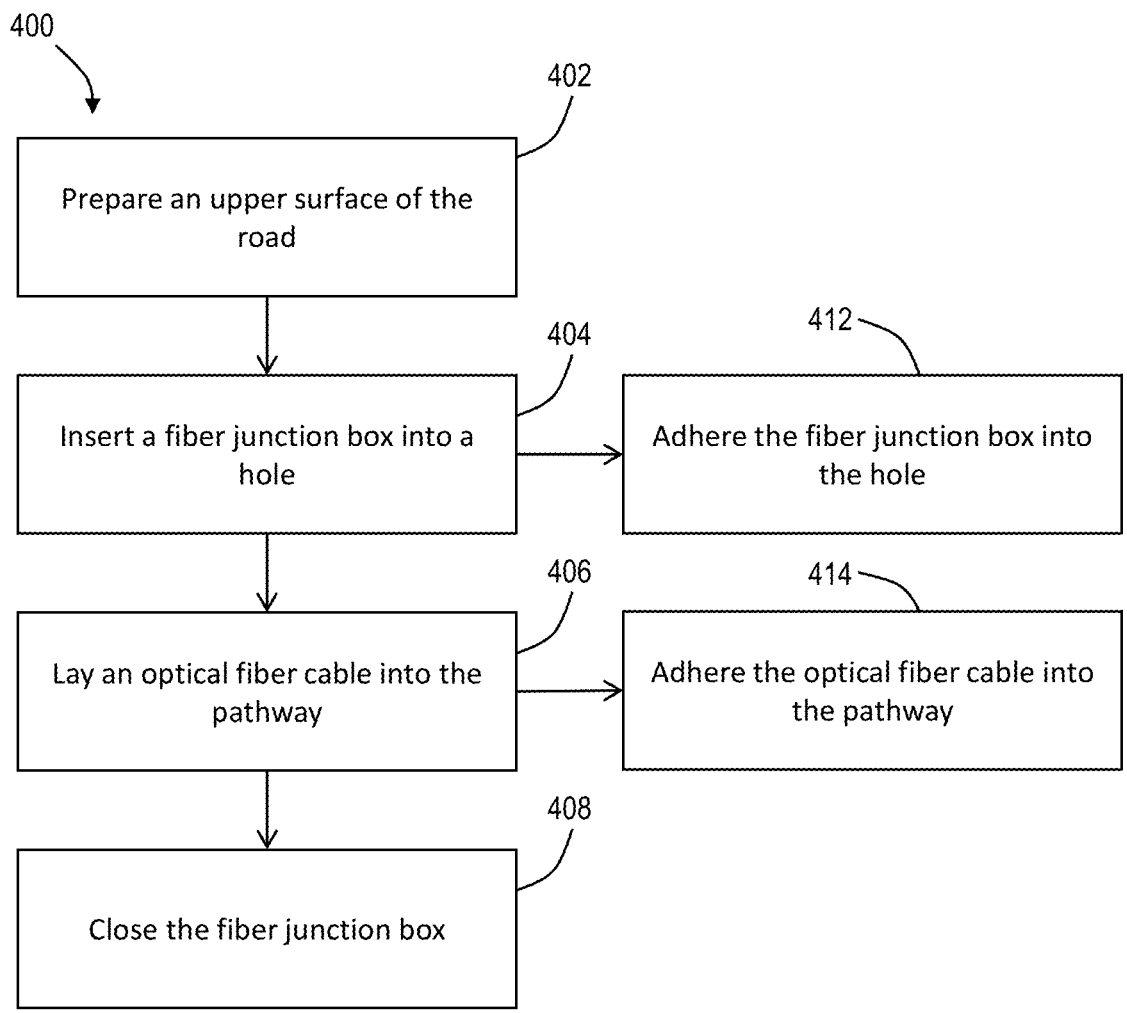

FIG. 7 depicts a method 400 for deploying the optical fiber tape 100 and the fiber junction box 200 into the road surface 300. Every embodiment need not necessarily have every step shown in FIG. 7; for example, some embodiments may not employ junction boxes. Referring also to FIGS. 1 and 3, the method 400 includes step 402 of preparing an upper surface of the road 300 by indenting into the upper surface the pathway 302. Optionally, step 402 also includes forming the hole 304, with the hole 304 being deeper than the pathway 302 and being connected to the pathway. Next, the method 400 includes an optional step 404 of inserting the fiber junction box 200 into the hole (optionally adhering it at step 412). Next, the method 400 includes step 406 of laying the optical fiber tape 100 into the pathway 302, optionally with an end 112 of the optical fiber tape protruding into the fiber junction box 200. At steps 404 and 406, the fiber junction box 200 and the optical fiber tape 100 do not protrude above the upper surface of the road 300.

Further, the method 400 includes a step 408 of closing the fiber junction box 200 after inserting the end 112 of the optical fiber tape 100 into the fiber junction box.

In one or more embodiments, the method 400 also includes a step 414 of adhering the optical fiber tape 100 into the pathway 302. Various adhesives can be used, e.g.:
plasticized rosin ester blended with fiber reinforced bitumen;
polymer modified bitumen;
polymer modified asphalt emulsion;
asphalt;
asphalt, quartz and attapulgite mix;
asphalt, ball clay and silicon dioxide mix;
MMA (methyl methacrylate);
asphalt, kaolin and polymer mix;
SAFETRACK MTI cold, liquid applied, self-consolidating, flexible roadway reinstatement system available from GCP Applied Technologies Inc., Cambridge, Mass., USA.

In one or more embodiments, the pathway 302 and the hole 304 are indented to less than full depth of the road. In such embodiments, a minimum depth of the pathway 302 is equal to the depth of the optical fiber 104 within the matrix 102; a maximum depth of the pathway 302 is about one inch. However, in other embodiments, the hole 304 could go all the way through the road surface. In one or more embodiments, the pathway 302 is indented by water jet scoring. In other embodiments, the pathway 302 is indented by abrasive wheel grinding. In one or more embodiments, the hole 304 is indented by core drilling and the fiber junction box 200 is cylindrical.

Recapitulation

Given the discussion thus far, it will be appreciated that, in general terms, an exemplary road has an upper surface and has a pathway indented into the upper surface to less than full depth of the road, with an optical fiber tape laid in the pathway. The optical fiber tape includes a matrix and at least one optical fiber connected to the matrix in an undulating manner. Undulations of the optical fiber are generally sinusoidal, semicircular, or elliptic, and are of amplitude and wavelength such that the minimum bend radius of each undulation is not less than a manufacturer's recommended minimum bend radius. The optical fiber tape does not protrude above the upper surface of the road. In one or more embodiments, an upper face of the optical fiber tape is flush with the upper surface of the road.

In one or more embodiments, the optical fiber tape is adhered into the pathway.

In one or more embodiments, the undulations of the at least one optical fiber are in a plane parallel to the upper surface of the road.

In one or more embodiments, the pathway and the optical fiber tape are rectilinear.

In one or more embodiments, the road includes a hole indented to less than the full depth of the road material into the upper surface and a fiber junction box is disposed in the hole. A first end of the optical fiber tape protrudes into the fiber junction box and a second end of the optical fiber tape is distal from the fiber junction box. The fiber junction box does not protrude above the upper surface of the road. In one or more embodiments, the fiber junction box is adhered into the hole. In one or more embodiments, the hole and the fiber junction box are cylindrical.

In one or more embodiments, the undulations of the optical fiber have a wavelength of between one and two inches and an amplitude of between 0.005 and 0.100 inches.

In one or more embodiments, the matrix comprises at least one material selected from the group consisting of: vinyl, aramid, cotton, polyester, polyethylene terephthalate, polystyrene, polypropylene, polyethylene, polyurethane, synthetic viscoelastic urethane polymer, wool, wood wool, liquid crystal polymer, and epoxy.

In another aspect, a method for deploying an optical fiber tape on a road includes preparing an upper surface of the road by indenting into the upper surface a pathway, and laying the optical fiber tape into the pathway so that the optical fiber tape does not protrude above the upper surface of the road. The optical fiber tape includes at least one undulating optical fiber, and is laid into the pathway with the undulations of the optical fiber in a plane parallel to the upper surface of the road.

In one or more embodiments, the method further includes alleviating thermal/mechanical stress caused by mismatch of coefficients of thermal expansion between the road and the at least one undulating optical fiber, by flexure of the undulations of the optical fiber.

In one or more embodiments, the method further includes indenting into the upper surface of the road a hole that is deeper than the pathway and connected to the pathway, and inserting into the hole a fiber junction box that has a cutout aligned to the pathway. In one or more embodiments, the pathway and the hole are indented to less than full depth of the road. In one or more embodiments, the hole is indented by core drilling and the fiber junction box is cylindrical.

Another aspect provides an optical fiber tape that includes a matrix and at least one optical fiber connected to the matrix in an undulating manner. The undulations of the optical fiber are generally sinusoidal, semicircular, or elliptic, and are of amplitude and wavelength such that the minimum bend radius of each undulation is not less than a minimum bend radius specified by a manufacturer of the optical fiber. In one or more embodiments, the undulations of the optical fiber are in a plane parallel to the breadth of the matrix. In one or more embodiments, the matrix comprises at least one material selected from the group consisting of: vinyl, aramid, cotton, polyester, polyethylene terephthalate, polystyrene, polypropylene, polyethylene, polyurethane, synthetic viscoelastic urethane polymer, wool, wood wool, liquid crystal polymer, and epoxy.

In one or more embodiments, the tape includes multiple optical fibers with matching undulations aligned peak to peak across the breadth of the matrix.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A road having an upper surface and comprising:
   a pathway indented into the upper surface to less than full depth of the road; and
   an optical fiber tape laid in the pathway;
   wherein the optical fiber tape comprises:
   a matrix; and
   at least one optical fiber connected to the matrix in an undulating manner, wherein undulations of the optical fiber are generally sinusoidal, semicircular, or elliptic, wherein the undulations are of amplitude and wavelength such that the minimum bend radius of each undulation is not less than a manufacturer's recommended minimum bend radius; wherein the optical fiber tape does not protrude above the upper surface of the road;
   wherein the undulations of the optical fiber have a wavelength of between one and two inches and an amplitude of between 0.005 and 0.100 inches.

2. The road of claim 1, wherein the optical fiber tape is laid in the pathway coextensive with the pathway.

3. The road of claim 2, wherein an upper face of the optical fiber tape is flush with the upper surface of the road.

4. The road of claim 2, wherein the optical fiber tape is adhered into the pathway.

5. The road of claim 2, wherein the undulations of the at least one optical fiber are in a plane parallel to the upper surface of the road.

6. The road of claim 2, wherein the pathway and the optical fiber tape are rectilinear.

7. The road of claim 2, further comprising:
   a hole indented to less than full depth into the upper surface; and
   a fiber junction box disposed in the hole,
   wherein a first end of the optical fiber tape protrudes into the fiber junction box and a second end of the optical fiber tape is distal from the fiber junction box,
   wherein the fiber junction box does not protrude above the upper surface of the road.

8. The road of claim 7, wherein the fiber junction box is adhered into the hole.

9. The road of claim 7, wherein the hole and the fiber junction box are cylindrical.

10. The road of claim 2, wherein the matrix comprises at least one material selected from the group consisting of: vinyl, aramid, cotton, polyester, polyethylene terephthalate, polystyrene, polypropylene, polyethylene, polyurethane, synthetic viscoelastic urethane polymer, wool, wood wool, liquid crystal polymer, and epoxy.

11. The road of claim 2, wherein the pathway is of a depth in the range of 0.100 inches to 1 inch.

* * * * *